United States Patent [19]
EerNisse et al.

[11] Patent Number: 6,131,462
[45] Date of Patent: Oct. 17, 2000

[54] PRESSURE/TEMPERATURE TRANSDUCER WITH IMPROVED THERMAL COUPLING AND ENHANCED TRANSIENT RESPONSE

[75] Inventors: Errol P. EerNisse, Salt Lake City; Lon J. Perry, West Jordan; Roger W. Ward, Park City; Robert B. Wiggins, Holliday, all of Utah

[73] Assignee: Delaware Capital Formation, Inc., Wilmington, Del.

[21] Appl. No.: 09/213,133

[22] Filed: Dec. 18, 1998

[51] Int. Cl.[7] .............................. G01L 11/00; G01L 7/00
[52] U.S. Cl. .................................. 73/702; 73/706; 73/756
[58] Field of Search .......................... 73/700, 702 R, 73/706, 756, 708

[56] References Cited

U.S. PATENT DOCUMENTS

| | | |
|---|---|---|
| 3,561,862 | 2/1971 | Karrer et al. . |
| 3,617,780 | 11/1971 | Benjaminson et al. . |
| 4,495,818 | 1/1985 | Ikeda et al. ............................ 73/702 |
| 4,550,610 | 11/1985 | EerNisse . |
| 4,660,420 | 4/1987 | EerNisse . |
| 4,754,646 | 7/1988 | EerNisse et al. . |
| 4,802,370 | 2/1989 | EerNisse et al. . |
| 5,221,873 | 6/1993 | Totty et al. . |
| 5,231,880 | 8/1993 | Ward et al. . |
| 5,337,612 | 8/1994 | Evans . |
| 5,471,882 | 12/1995 | Wiggins ................................ 73/702 |
| 5,578,759 | 11/1996 | Clayton ................................ 73/702 |

*Primary Examiner*—Eric S. McCall
*Assistant Examiner*—Abdullahi Aw-Musse
*Attorney, Agent, or Firm*—Trask Britt

[57] ABSTRACT

A transducer pressure crystal having improved thermal coupling with the environment external to a pressure housing in which the crystal is disposed. A cylindrical major portion of the side wall of the pressure crystal is located immediately adjacent an inner wall of a chamber within the pressure housing, separated therefrom only by dimensional tolerances sufficient to ensure that the crystal is surrounded by pressure-transmitting fluid exposed to pressure from the external environment. The thermal time constant of the transducer for external temperature changes is significantly decreased. The time constant of the transducer for temperature changes in the pressure-transmitting fluid produced by rapid pressure changes is similarly decreased. A thin, electrically insulating element may optionally be disposed between the crystal side wall and the inner wall to preclude electrical grounding of the crystal to the housing. The electrically insulating element may comprise a discrete film, such as a high temperature plastic, or an insulating layer on the inner wall of the pressure housing. Various embodiments of the present invention are disclosed, including different crystal and interior pressure housing configurations. In one embodiment, both pressure and temperature crystals are deployed in the fluid-filled chamber.

54 Claims, 6 Drawing Sheets

PRESSURE/TEMPERATURE TRANSDUCER WITH IMPROVED THERMAL COUPLING AND ENHANCED TRANSIENT RESPONSE

BACKGROUND OF THE INVENTION

1. Field of the Invention

The present invention relates to a pressure and temperature transducer suitable for use downhole in oil, gas, geothermal and other wells, at the wellhead, in industrial applications, for portable calibration devices and in laboratory applications. More specifically, by way of example and not limitation, the invention in its preferred embodiment relates to a piezoelectrically-driven quartz crystal resonator pressure and temperature transducer exhibiting improved thermal coupling to the environment external to a housing in which the transducer is located. The invention provides enhanced transient response for the transducer to better accommodate relatively rapidly-changing temperatures external to the housing such as may be encountered when the transducer is rapidly run into, or withdrawn from, a deep well bore. The invention also provides enhanced transient response for the transducer to better accommodate rapidly changing temperatures in a pressure-transmitting fluid inside the housing, such as those initiated due to rapid changes in pressure (commonly referred to as PV heating) such as may be produced by fluid sampling for formation testing or other rapid pressure drawdowns in a well bore.

2. State of the Art

The type of quartz crystal pressure transducer assembly in which sensors, as disclosed herein may preferably be employed includes a first pressure sensitive quartz crystal resonator, a second temperature sensitive quartz crystal resonator, a third reference frequency quartz crystal resonator, and supporting electronics. For convenience, the terms "crystal" and "resonator" may be used interchangeably herein in referencing a resonating quartz crystal element.

In a transducer assembly of the referenced type, the first crystal changes frequency in response to changes in applied external pressure and temperature, while the output frequency of the second crystal is used to compensate for temperature-induced frequency excursions in the first and third crystals. The third crystal generates a reference signal, which is only slightly temperature dependent, against or relative to which the temperature and pressure-induced frequency changes in the first crystal and the temperature-induced frequency changes of the second crystal can be compared. Means for comparison, as known in the art, include frequency mixing and/or using the reference frequency to count the signals from the other two crystals. The first resonator is exposed via a fluid interface to the external pressure sought to be measured, and all three resonators are preferably thermally coupled to the fluid to provide a rapid thermal response time. The transducer (crystals plus electronics, the latter disposed in a pressure housing) is calibrated as a complete unit over the intended pressure and temperature range so that all temperature and pressure related effects can be compensated for in the resulting calibration curve-fit coefficients. Exemplary patents for transducers using three crystal resonators, each assigned a function as described above, are U.S. Pat. No. 3,355,949 to Elwood et al., U.S. Pat. No. 4,802,370 to EerNisse et al. and U.S. Pat. No. 5,231,880 to Ward et al.

The first crystal, which may also be termed a pressure crystal or pressure sensor crystal, employed in pressure transducer assemblies of the prior art, has been commonly configured to include a disc-shaped resonator element incorporated in a tubular cylindrical housing assembly, the ends of the housing assembly being closed. The cylindrical housing assembly, when subjected to exterior pressure of a fluid to be monitored, elastically deforms and thus causes the frequency of the resonator element to shift, the frequency output thus being indicative of the pressure. As noted above, the frequency output may then be preferably temperature-compensated, as known in the art. Exemplary pressure sensor crystal configurations are disclosed in U.S. Pat. No. 3,561,832 to Karrer et al., U.S. Pat. No. 3,617,780 to Benjaminson et al., U.S. Pat. No. 4,550,610 to EerNisse, U.S. Pat. No. 4,660,420 to EerNisse, U.S. Pat. No. 4,754,646 to EerNisse et al., U.S. Pat. No. 4,802,370 to EerNisse et al., U.S. Pat. No. 5,221,873 to Totty et al., U.S. Pat. No. 5,578,759 to Clayton and in EerNisse, "Quartz Resonator Pressure Gauge: Design and Fabrication Technology," Sandia Laboratories Report No. SAND78-2264, (1978).

U.S. Pat. No. 4,660,420 to EerNisse recognizes the desirability of selecting a pressure crystal with a crystal cut having substantial independence from temperature-induced frequency changes over the intended range of temperatures, as well as a relatively large scale factor, i.e., greater frequency sensitivity to pressure changes in the range to be measured. For the pressure and temperature ranges experienced in oil and gas wells, an AT-cut quartz crystal is disclosed in EerNisse '420 to possess these attributes. However, even the AT-cut quartz crystal disclosed in EerNisse '420 exhibits some demonstrated susceptibility to temperature changes.

Figure 1:
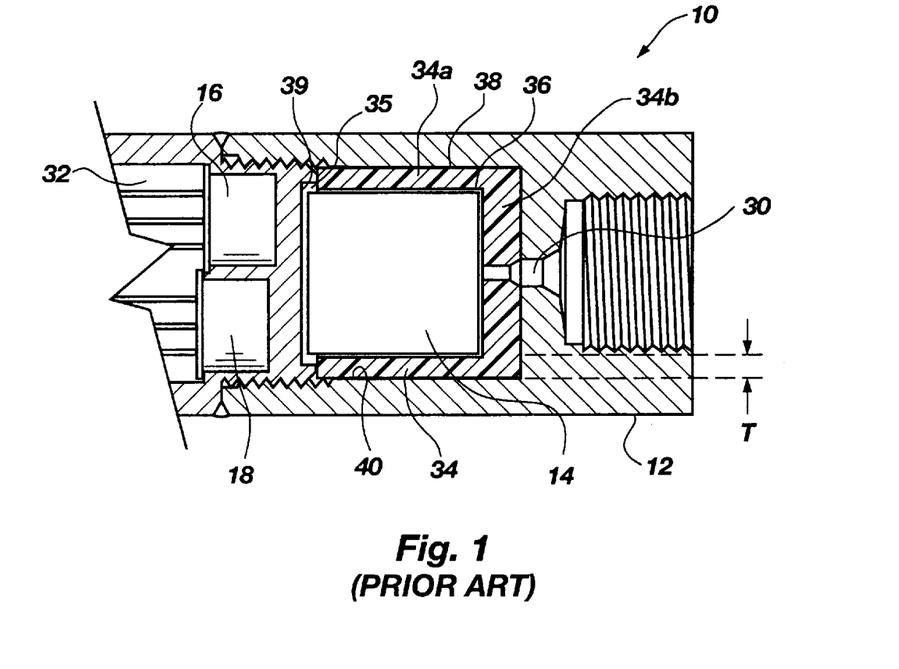
FIG. 1 is a side sectional elevation of a portion of an exemplary prior art pressure and temperature transducer used in well bores.

It is desirable to electrically insulate the first, or pressure sensor, crystal from the interior wall of the metal pressure housing in which the crystal is located. As disclosed in the aforementioned U.S. Pat. Nos. 5,231,880 and 5,578,759, a fairly robust electrically insulating spacer has typically been placed about the pressure sensor crystal. An exemplary prior art transducer sensor arrangement similar to that shown in these two patents is reproduced in FIG. 1 of the drawings, wherein transducer 10 includes electronics which drive and respond to the output of quartz crystal resonators (see FIG. 2). The electronics and resonators are usually contained within a common housing, such as pressure housing 12. The three resonators, as mentioned above, include a pressure crystal 14, a temperature crystal 16 and a reference crystal 18. Only the pressure crystal 14 is subjected to the pressure of fluid external to the pressure housing 12 via inlet 30, temperature crystal 16 and reference crystal 18 being intentionally isolated from pressure effects by their packaging and location. The electrical feedthrough (not shown for clarity) to electronics in chamber 32 for driving and sensing the frequency response of pressure crystal 14 to changes in pressure is pressure proof, as known in the art. Cup-shaped electrically insulating spacer 34 may be formed of a plastic such as polyetheretherketone (PEEK) and typically has a side wall 34a of thickness T of about 70 mils, or 0.070 inch. Spacer 34 supports the pressure crystal 14 while permitting access by a fluid 35 surrounding the crystal to substantially the entire exterior thereof so as to enable substantially instantaneous transmission to the crystal of pressure external to the pressure housing. The spacer 34 also facilitates flushing contaminated fluids from around pressure crystal 14. However, a preferred bellows-type pressure transmission configuration which isolates fluid 35 from the environment external to the pressure housing, as well as preferred materials for fluid 35, is disclosed in U.S. Pat. No. 5,337,612 to Evans, the disclosure of which is incorporated herein for all purposes by this reference. The invention of the '612 patent has substantially eliminated any need for flushing. Protection of pressure crystal 14 against lateral shock loading is effected through the phenomenon of "squeeze-film damping" in the two coaxial fluid-filled annular spaces 36 and 38, respectively, lying between pressure crystal 14 and spacer side wall 34a and spacer side wall 34a and inner wall 40 of pressure housing 12. A thin circular disc 39 of an electrically insulating material such as Kapton® may be placed at the open end of spacer 34 to protect one end of pressure crystal 14 against axial shock loading (again, by squeeze-film damping) and electrical shorting, while the end wall 34b of spacer 34 protects the other end of pressure crystal 14. Spacer 34 also provides diametrically-opposed longitudinal channels (not shown) to accommodate wires running the full length of pressure crystal 14 to the electrical feedthrough from wire attachment points on the sides of pressure crystal 14 proximate end wall 34b to provide slack and flexibility to the wires and reduce stress on the joints (using, for example, conductive epoxy or solder) securing the wires at the wire attachment points to plated, electrically-conductive electrodes on the crystal exterior. Spacer 34 also precludes electrical grounding of the electrodes, wire bonds and any bare wire portions to inner wall 40 of pressure housing 12. However, while providing some benefits to the structure of transducer 10 as configured, the relatively thick spacer side wall 34a precludes effective thermal coupling of pressure crystal 14 with pressure housing 12 under rapidly transient temperature conditions such as might be encountered when running transducer 10 on a wire line or slick line into or out of a well bore at a relatively high rate of speed.

Similarly, the disposition of relatively thick, electrically insulating end caps over a sensor assembly, such a structure being disclosed in the aforementioned U.S. Pat. No. 4,802,370, is accompanied by the same disadvantages as mentioned above with respect to the use of a spacer.

To quantify the temperature transients involved under conditions wherein a transducer is moving in a well bore, 1° C. per minute may be characterized as typical, while 2° C. per minute may be close to the maximum. Such temperature changes external to the pressure housing may induce error in indicated pressure. In addition, pressure steps also produce temperature changes due to PV heating (see U.S. Pat. No. 5,471,882); a 4000 psi step can produce a 1° C. step in the fluid surrounding the pressure crystal.

U.S. Pat. Nos. 5,337,612 and 5,471,882 disclose transducer assemblies which do not depict or discuss the use of a spacer, but which nonetheless depict a significant annular gap or void between the pressure crystals (or pressure and temperature in the case of the '882 patent), which gap or void would significantly reduce thermal coupling between the crystals and the surrounding pressure housing. Further, the large volume of fluid surrounding the pressure crystal in the pressure housing cavity would render the transducer susceptible to significant PV heating. Moreover, while a spacer was not depicted or discussed in the '612 or '882 patents as not material to the inventions respectively disclosed and claimed therein, in actuality, transducers according to the respective inventions of the '612 and '882 patents were always built with spacers, most commonly of the aforementioned PEEK material but, in a small number of cases, of alumina. An electrically insulating spacer was always required to prevent electrical grounding of the pressure crystal to the metal pressure housing.

While prior art devices, as referenced above, have attempted to address various deficiencies in quartz resonator and transducer design, those of ordinary skill in the art have failed to recognize that thermal coupling and thus transient temperature response of such transducers may be greatly enhanced and inaccuracy reduced in the presence of rapidly-changing temperatures external to the transducer pressure housing through certain relatively straightforward modifications to the physical structure of the transducer assembly and resonators employed therein.

BRIEF SUMMARY OF THE INVENTION

The present invention provides significantly improved thermal coupling of at least a pressure crystal of a transducer with the environment external to a pressure housing in which the crystal is disposed. Such improvement is provided by placing at least a major portion of the side wall of the pressure crystal immediately adjacent an inner wall of the pressure housing, separated from the inner wall only by a gap with dimensional tolerances sufficient to ensure that the crystal is surrounded by a pressure-transmitting, preferably substantially incompressible, fluid. Thus, the thermal time constant of the transducer for external temperature changes is significantly decreased. Likewise, the thermal time constant of the transducer for temperature changes inside the pressure housing is also reduced. Temperature changes of the pressure-transmitting fluid are typically produced by pressure changes external to the housing acting on the substantially incompressible, but nonetheless slightly compressible, pressure-transmitting fluid.

In some embodiments of the invention, the pressure crystal may be separated from the inner wall of the pressure housing by an electrically insulating element if such an element is required to prevent electrical grounding of the crystal to the metal of the pressure housing. The electrical insulation element may comprise a discrete film such as a high temperature-tolerant plastic, or an electrically insulating layer on the inner wall of the pressure housing.

In addition to the reduction in annular distance between the pressure crystal and the pressure housing, the present invention also includes modification of the external configuration of the pressure crystal by placing attachment points for wire or other conductive elements (for electrical connection of the pressure crystal to supporting electronics through a pressure-proof feedthrough) to conductive electrodes on circumferentially-spaced, beveled surfaces on the crystal side wall, wire bonds at the attachment points on the beveled surfaces thus being somewhat recessed from, and lying out of contact with, the inner wall of the pressure housing. Alternatively, the pressure housing may be counterbored proximate an end of the crystal to a larger interior diameter sufficient to accommodate (i.e., clear) wire bonds protruding at the attachment points from circumferentially-spaced electrodes on the side wall. Further, the pressure housing may be merely notched, rather than counterbored, in order to accommodate wire bonds protruding at attachment points from circumferentially-spaced electrodes on the crystal side wall. In yet another alternative approach, circumferentially-spaced surfaces may be machined on the side wall of the pressure crystal and electrodes placed on the surfaces to provide effectively recessed wire attachment points so that wire bonds protruding therefrom lie out of contact with the inner wall of the pressure housing. Finally, the metal electrodes may be extended onto a flat end of the pressure crystal, and the wires attached to the electrode extensions thereon. In this instance, the wall of the pressure housing through which the electrical feedthrough extends may include one or more recesses for clearance of the wires protruding from the flat crystal end.

The invention also contemplates the disposition of adjacent pressure and temperature crystals within a pressure housing chamber, the side walls of both of the crystals lying in immediate proximity to the inner wall of the chamber.

DETAILED DESCRIPTION OF THE INVENTION

Figure 2:
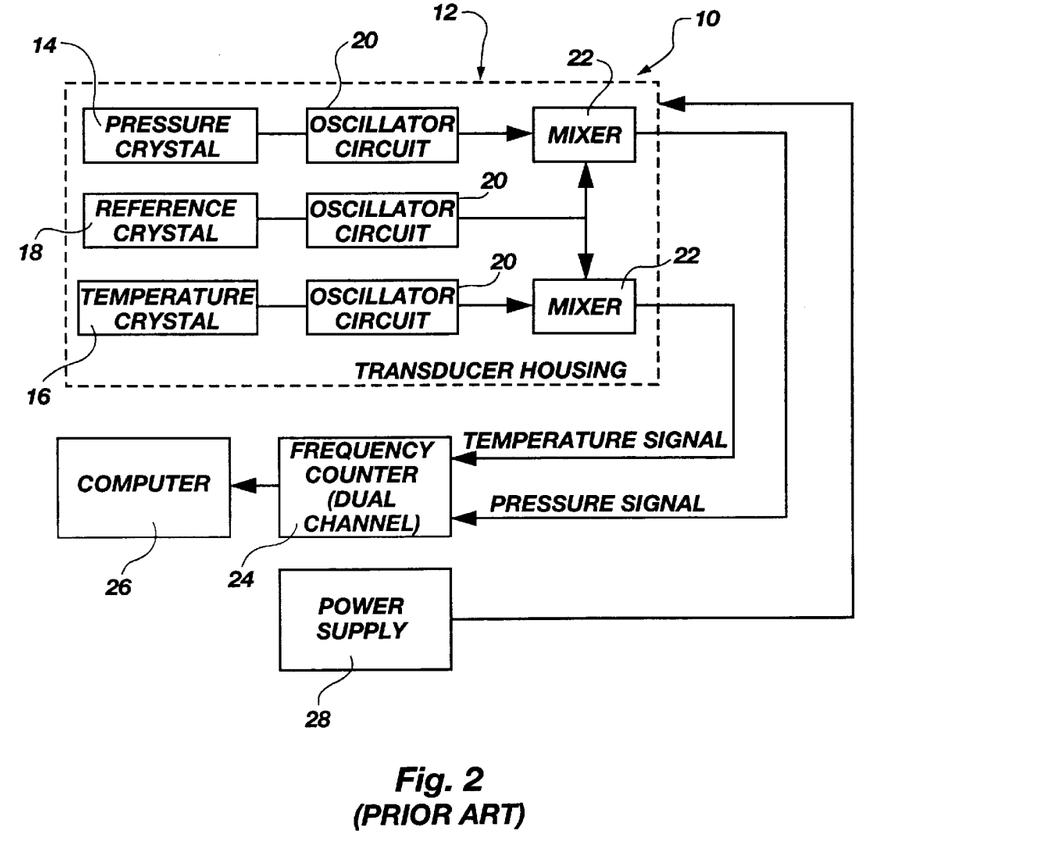
FIG. 2 is a block diagram of a transducer for pressure and temperature measurement in which a pressure crystal configured, housed and electrically connected according to the present invention may be employed.

Transducer electronics suitable for use in the present invention are schematically illustrated in FIG. 2 and include features well known in the art, such as oscillator circuits 20 and mixer circuits 22. The oscillator circuits 20 which are coupled to electrodes associated with each of the quartz crystal resonators, piezoelectrically drive the quartz crystal resonators to vibrate in a manner well known in the art and transmit the frequency output of the oscillators to mixer circuits 22. The mixed outputs are then transmitted to processor circuits, such as frequency counter 24, exterior to an exemplary transducer 10. The transducer electronics of FIG. 2 are suitable for use with the transducers disclosed herein. The processor circuits receive the mixed frequency outputs of the crystals and convert same to values representative of pressure and temperature data. The temperature output frequency may also be employed to enhance the accuracy of the pressure data by compensating for temperature-induced frequency deviations of the pressure and reference crystals. Actual pressure and temperature data is developed via a computer 26 receiving output from frequency counter 24. Power for the transducer is supplied by a DC power supply 28, which may comprise batteries of any suitable power, voltage and temperature stability. In industrial or laboratory applications, the power supply may, of course, comprise a conventional DC power supply.

Figure 3:
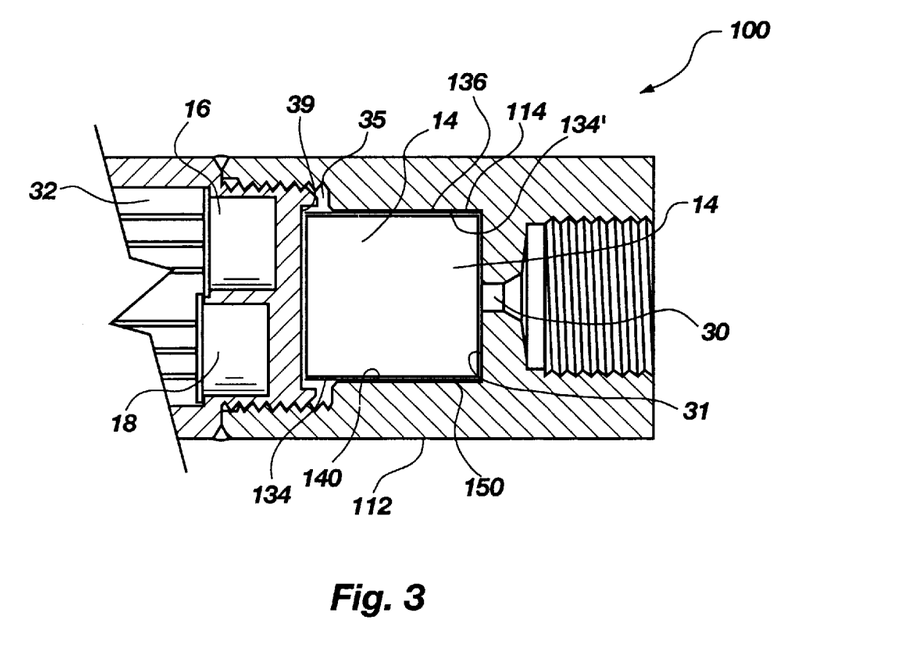
FIG. 3 is a side sectional elevation of a portion of a pressure transducer configured for enhanced thermal coupling according to the present invention.

FIG. 3 of the drawings depicts a pressure and temperature transducer 100 according to the present invention. For clarity, elements of transducer 100 which correspond to those previously identified with respect to transducer 10 of FIG. 1 will be identified with the same reference numerals. As shown, pressure housing 112 includes a chamber 114 in which pressure crystal 14 is disposed, surrounded by fluid 35. In contrast to FIG. 1, it will be appreciated that the annular gap 150 between the side exterior of pressure crystal 14 and the inner wall 140 of pressure housing 112 defining chamber 114 is far less than the thickness of side wall 34a of spacer 34 shown in FIG. 1. An electrically insulating element in the form of an insulating film 134, preferably comprising a rectangular sheet of a Kapton® H high temperature polyimide rolled into a cylinder, may be disposed, where appropriate, to prevent electrical grounding of pressure crystal 14 to inner wall 140 of pressure housing 112, within annular gap 150. Annular gap 150 is preferably about 15 mils or less, and most preferably between about 4 and 15 mils if insulating film 134 of a currently preferred thickness of about 3 mils is employed, leaving an actual unfilled annular gap of between about 1 mil and 12 mils. Of course, a thinner insulating film 134 would permit a smaller annular gap 150. If an electrically insulating coating or other barrier is employed on the inner wall 140, or a particular embodiment of the invention does not require an electrically insulating element, the actual annular gap 150 may be as small as about one mil.

The somewhat resilient Kapton® film 134, when rolled into a cylinder, inserted into chamber 114 and released, unrolls against inner wall 140. The length of the insulating film 134, as measured circumferentially when rolled, is selected to provide a slight, longitudinally-extending gap between the adjacent ends of the insulating film 134, on the order of 35 mils, ±10 mils. Thus, pressure crystal 14 is placed in immediate proximity to pressure housing 112. As the somewhat resilient insulating film 134 tends to "unwrap" from its rolled configuration against the inner wall 140, insulating film 134 is in substantial contact with inner wall 140 and defines an annular space 136 between the pressure crystal 14 and the interior of insulating film 134, preferably ranging only from a minimum of about 6 mils to a maximum of 12 mils, annular space 136 being, of course, filled with fluid 35. This arrangement provides the aforementioned squeeze-film damping for shock protection of pressure crystal 14 without the thermal impediment of the thick side wall 34a of prior art spacer 34.

In lieu of a discrete insulating film 134, the inner wall 140 may be coated with a thin (1–3 mils) layer 134' of electrically insulating material such as Teflon®, or the metal surface of the inner wall 140 may be anodized or oxidized (depending on the material of pressure housing 112) to provide electrical insulation between the plated electrodes, wire attachment points and bare wire ends and the metal of the pressure housing 112. For example, an aluminum housing (for relatively low pressure applications) may be provided with an $Al_2O_3$ lining on inner wall 140 of about 10 $\mu$m thickness. If this approach is employed, the annular gap 150 may be as small as 1 mil, since no clearance for an insulating film 134 is required. Further, the wire attachment points, bare wire ends and electrodes might, in lieu of the use of an electrically insulating film, coating or layer between pressure crystal 14 and inner wall 140, be covered with a thin conformal layer of electrically insulating material. One suitable material for this application is Parylene®, a plastic material which may be applied in very thin layers using chemical vapor deposition (CVD) in a vacuum system. A suitable thickness for a protective, electrically insulating layer of Parylene® is 5–25 μm. However, Parylene® may not be suitable for use above about 175° C. Moreover, stress changes with time between any conformal electrically insulating layer and pressure crystal 14 will appear to pressure crystal 14 as pressure changes. Accordingly, this alternative may be less preferred for some applications.

While not as significant in terms of improving thermal coupling as placing pressure crystal 14 in immediate proximity to inner wall 140, it should be noted that the end of pressure crystal 14 closest to inlet 30 is also in immediate proximity to the metal end wall 31 of pressure housing 112, preferably within about 22 mils±18 mils. As small a gap as possible is desirable; the large variation, as noted, is due to additive tolerances when the transducer is assembled. Again, the aforementioned squeeze-film damping involving fluid 35 provides shock protection for pressure crystal 14.

In the embodiment of FIG. 3, as well as in the following embodiments of FIGS. 4–15, inclusive, an electrically-insulating element may be, and usually is employed between an end of the pressure (or other) crystal closest to the feedthrough wall between chamber 114 and electronics chamber 32. The element may comprise a Kapton® disc 39, as identified in FIG. 3, but the precise configuration of the electrically insulating element to preclude electrical grounding of the crystal to the pressure housing may vary with the structure and configuration by which a crystal is electrically connected to conductive terminals extending through the feedthrough wall. For example, the electrically insulating element may be annular, or circular with cut-outs for wires 226 (see below) to extend therethrough, selection of the exact element configuration being within the expertise of one of ordinary skill in this art. In some instances, for example, in the case of an anisotropically-conductive, polymer-based layer, film or pad interposed between the crystal end and the feedthrough connections to effect electrical connection between the electrodes and the feedthrough connections, the connecting element may itself provide the requisite electrical insulation.

In the following descriptions of six preferred embodiments of the transducer of the present invention, like elements and features are identified with similar reference numerals, and identical elements and features previously identified in a figure are designated thereafter with the same numerals for clarity.

Figure 4:
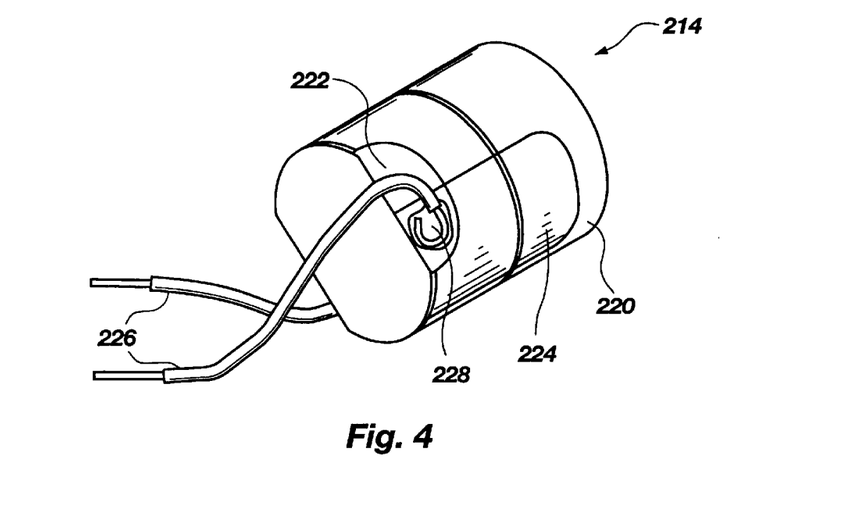
FIGS. 4, 5 and 6 are, respectively, a perspective view of a pressure crystal configured for a first preferred embodiment of the present invention, a side sectional view of the crystal of FIG. 4 disposed within a portion of a pressure housing, and an end sectional view taken across line 6—6 of FIG. 5.
Figure 5:
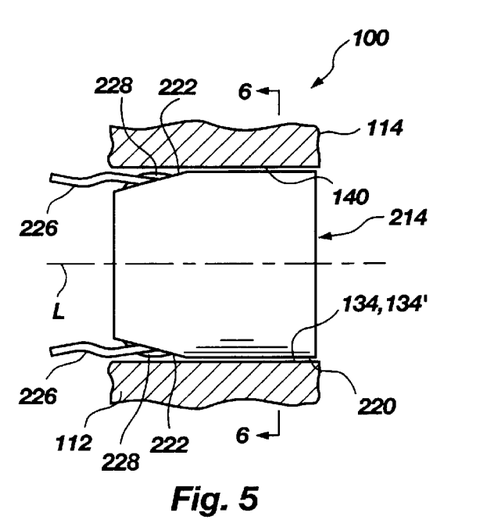
Figure 6:
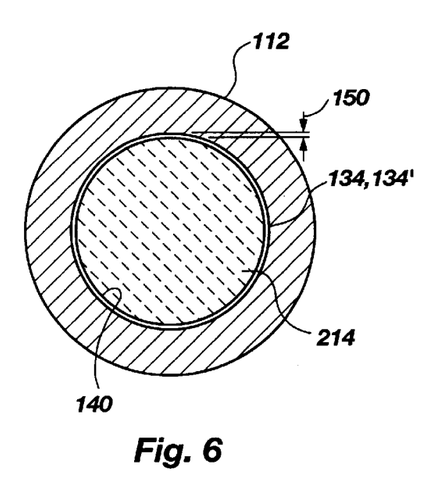

FIGS. 4–6 of the drawings depict a pressure crystal 214 configured in accordance with the invention and its disposition within a fluid-filled chamber 114 of a metal pressure housing 112 of the first transducer embodiment 100 according to the invention. Pressure crystal 214 (see FIG. 4) includes a substantially cylindrical exterior side surface or wall 220 having circumferentially-spaced beveled surfaces 222 inclined at an acute, preferably less than 45° angle to longitudinal axis L of pressure crystal 214. Beveled surfaces 222 are preferably located, as shown, on one, common end of pressure crystal 214, but the invention is not so limited. Similarly, beveled surfaces 222 are depicted as flats, but may be otherwise configured. Conductive, preferably plated, chrome-gold electrodes 224 communicate with the interior of pressure crystal 214 for driving and sensing the frequency response of pressure crystal 214, as known in the art, and each electrode 224 extends over at least a portion of an associated beveled surface 222 to provide locations recessed (see FIG. 5) within the surface of revolution defined by cylindrical exterior side surface or wall 220 for attachment of wires 226 to electrodes 224 with conductive epoxy 228. Thus, conductive materials such as bare ends of wires 226 and the conductive epoxy 228 at and adjacent the attachment locations are out of contact with inner wall 140 of pressure housing 112. As best shown in FIG. 5, insulating film 134 or inner wall coating 134' preferably extends over electrodes 224, both on beveled surfaces 222, as well as on cylindrical exterior side surface or wall 220, over conductive epoxy 228 and over any exposed (bare) portions of wires 226 to prevent grounding of the electrical circuit associated with pressure crystal 214 to pressure housing 112. The inventors currently contemplate that the embodiment of FIGS. 4–6 herein comprises the best mode of the invention.

Figure 7:
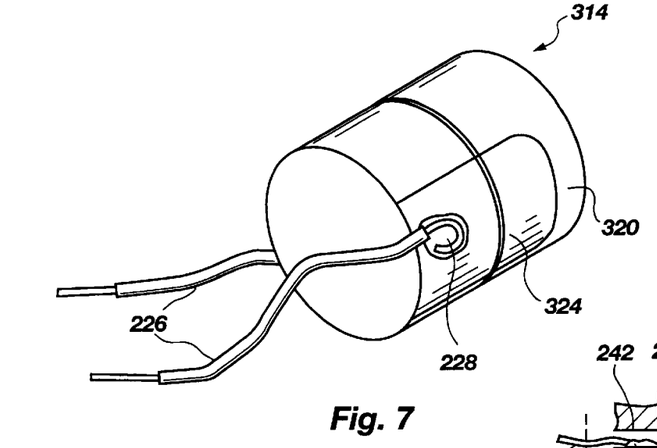
FIGS. 7 and 8 are, respectively, a perspective view of a pressure crystal configured for a second preferred embodiment of the present invention and a side sectional view of the crystal disposed within a portion of a pressure housing configured according to the invention.
Figure 8:
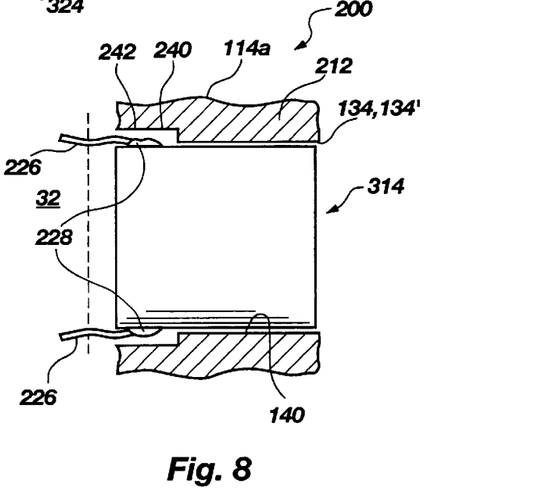

FIGS. 7 and 8 of the drawings depict a pressure crystal 314 configured in accordance with the present invention and its disposition within a fluid-filled chamber 114*a* of pressure housing 212 of a second transducer embodiment 200 according to the invention. Pressure crystal 314 includes a substantially cylindrical exterior side surface, or wall 320. Conductive electrodes 324 communicate with the interior of pressure crystal 314 for driving and sensing the frequency response of pressure crystal 314, as known in the art, and preferably extend to an end of pressure crystal 314 which is located closest to an electrical feedthrough to chamber 32 in pressure housing 212, although the invention is not so limited. Pressure housing 212 includes at least one counterbore 242 defined by inner wall 240, of greater diameter than inner wall 140, to provide sufficient clearance for attachment of wires 226 to electrodes 324 with conductive epoxy 228 without risk of grounding of the electrical circuit associated with pressure crystal 314 to pressure housing 212. If the wire attachment locations are at different ends of pressure crystal 314, two counterbores 242 may be employed. As best shown in FIG. 8, insulating film 134 or inner wall coating 134' extends substantially around side surface or wall 320 of pressure crystal 314 for approximately three-fourths of the length of pressure crystal 314, again to prevent electrical grounding of electrodes 324 to pressure housing 212.

Figure 9:
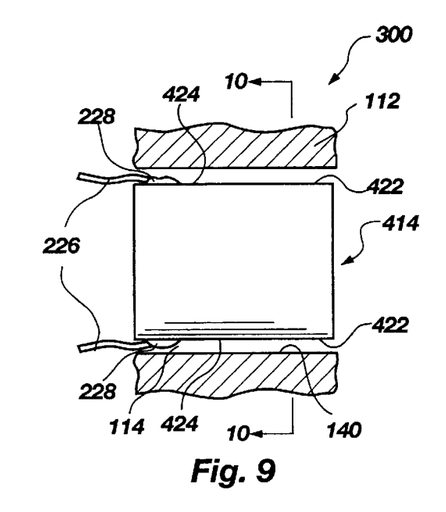
FIGS. 9 and 10 are, respectively, a side sectional view of a third preferred embodiment of the present invention including a pressure crystal configured according to the present invention disposed within a portion of a pressure housing and an end sectional view taken across line 10—10 of FIG. 9.
Figure 10:
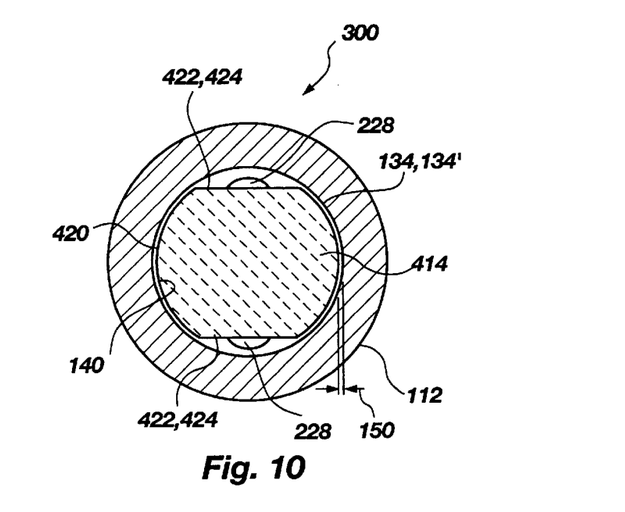

FIGS. 9 and 10 of the drawings depict a pressure crystal 414 configured in accordance with the present invention and its disposition within a fluid-filled chamber 114 of a pressure housing 112 of a third transducer embodiment 300 according to the invention. Pressure crystal 414 includes a substantially cylindrical exterior side surface or wall 420 having longitudinally-oriented, circumferentially-spaced surfaces 422 extending the length thereof. Conductive electrodes 424 communicate with the interior of pressure crystal 414 for driving and sensing the frequency response of pressure crystal 414, as known in the art, and extend to an end of pressure crystal 414 which is located closest to an electrical feedthrough to chamber 32 in pressure housing 112. Surfaces 422 provide sufficient clearance from inner wall 140 so that attachment of wires 226 to electrodes 424 with conductive epoxy 228 is effected within the surface of revolution defined by cylindrical exterior side surface or wall 420 and out of proximity to inner wall 140 of pressure housing 112. Grounding of the electrical circuit associated with pressure crystal 414 to pressure housing 112 through electrodes 424, exposed (bare) portions of wires 226 and conductive epoxy 228 is prevented by recessing of the wire attachment locations from inner wall 140 on surfaces 422. Thus, insulating film 134 or inner wall coating 134', which extends, as shown, substantially around pressure crystal 414 and over the entire length of exterior cylindrical side surface or wall 420 of pressure crystal 414, is optional in this embodiment. It should be noted that the omission of an electrically insulating element permits a crystal side wall-to-inner wall clearance as small as about 1 mil.

Figure 11:
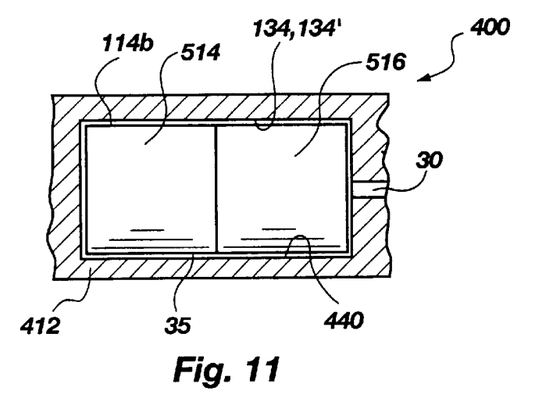
FIG. 11 is a schematic side sectional elevation of a fourth preferred embodiment of the present invention wherein a pressure crystal and an adjacent temperature crystal are disposed within a pressure housing chamber.

Referring now to FIG. 11 of the drawings, an arrangement of mutually-adjacent pressure and temperature crystals 514 and 516 in accordance with the aforementioned U.S. Pat. No. 5,471,882 is depicted disposed in a chamber 114b of a pressure housing 412 of a transducer 400 according to a fourth preferred embodiment of the present invention. U.S. Pat. No. 5,471,882 is hereby incorporated herein for all purposes by this reference. As shown, both crystals 514 and 516 are located immediately adjacent inner wall 440 of chamber 114b with only sufficient clearance being allowed between the side walls of the crystals 514 and 516 and inner wall 440 for pressure-transmissive fluid 35 to surround crystals 514 and 516. Any suitable arrangement, as disclosed herein, for electrically connecting crystals 514 and 516 to the transducer electronics through a feedthrough may be employed. One specific suitable arrangement includes the use of circumferentially-spaced surfaces recessed from the surface of revolution defined by the cylindrical side walls of each of crystals 514 and 516, the surfaces on the crystal side walls being mutually rotationally in phase with each other to permit passage of wires of the farthest crystal 516 from the feedthrough to the electronics past crystal 514 closer thereto. The closer crystal 514 may additionally include beveled surfaces on the end thereof closest to the feedthrough to recess the wire bonds of the closest crystal 514 to facilitate passage of the wires from the farthest crystal 516. As with preceding and succeeding embodiments of the invention, the use of an electrically insulating element in the form of a film 134 or coating 134' may or may not be desirable or required to prevent electrical ground to the pressure housing, depending upon the location and structure by which the crystals 514 and 516 are electrically connected to supporting electronics.

Figure 12:
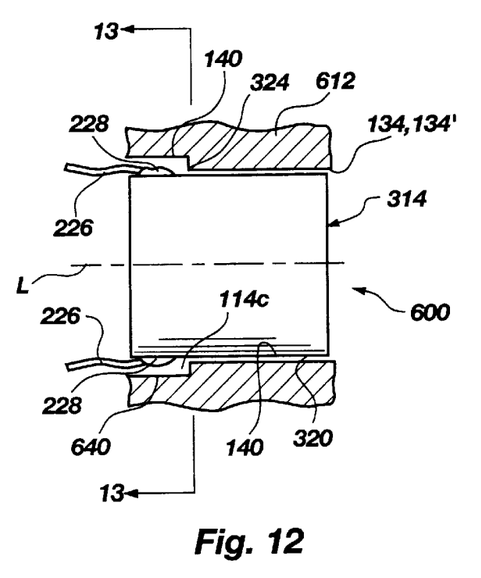
FIGS. 12 and 13 are, respectively, a side sectional view of a crystal disposed within a portion of a pressure housing according to a fifth preferred embodiment of the present invention and an end sectional view taken across line 13—13 of FIG. 12.
Figure 13:
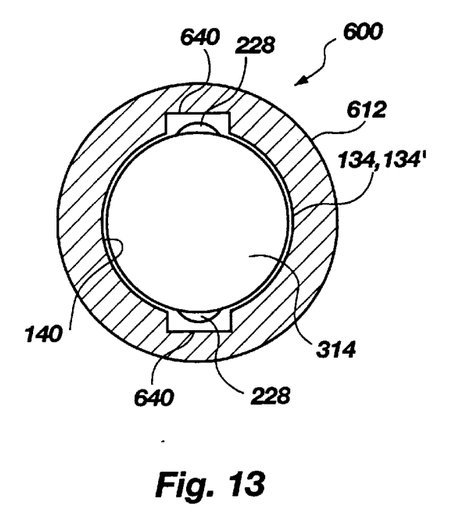

FIGS. 12 and 13 of the drawings depict a pressure crystal 314 (see also FIG. 7) configured in accordance with the present invention and its disposition within a fluid-filled chamber 114c of pressure housing 612 of a fifth transducer embodiment 600 according to the invention. Pressure crystal 314 includes a substantially cylindrical exterior side surface or wall 320. Conductive electrodes 324 communicate with the interior of pressure crystal 314 for driving and sensing the frequency response of pressure crystal 314, as known in the art, and preferably extend to an end of pressure crystal 314 which is located closest to an electrical feedthrough to chamber 32 in pressure housing 612. Pressure housing 612 includes two notches 640 extending radially outwardly from inner wall 140 to provide sufficient clearance for attachment of wires 226 to electrodes 324 with conductive epoxy 228 without risk of grounding of the electrical circuit associated with pressure crystal 314 to pressure housing 612. Although less preferred, the electrodes 324 may extend to different ends of pressure crystal 314, with notches 640 located accordingly and one notch extending along the length of pressure crystal 314 to accommodate a wire 226. As best shown in FIG. 12, insulating film 134 or inner wall coating 134' preferably extends substantially around side surface or wall 320 of pressure crystal 314 for approximately three-fourths of the length of pressure crystal 314, again to prevent electrical grounding of electrodes 324 to pressure housing 612. It should be noted that the embodiment of FIGS. 12 and 13 may be preferred to that of FIGS. 7 and 8 since the notches 640 minimize the fluid volume of chamber 114c in comparison to that of counterbored chamber 114a.

Figure 14:
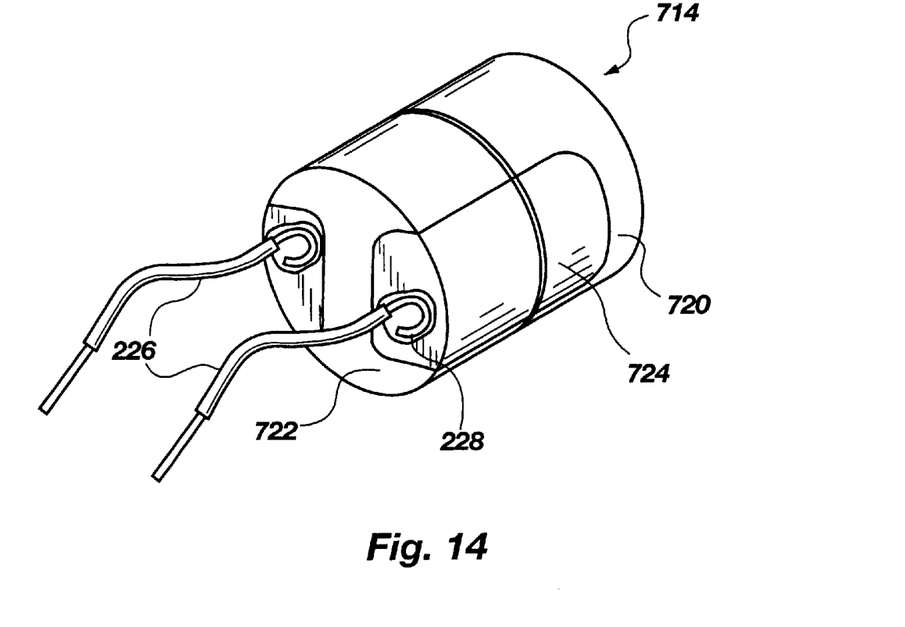
FIGS. 14 and 15 are, respectively, a perspective view of a pressure crystal configured for a sixth preferred embodiment of the present invention and a side sectional view of the crystal disposed within a portion of a pressure housing configured according to the invention.
Figure 15:
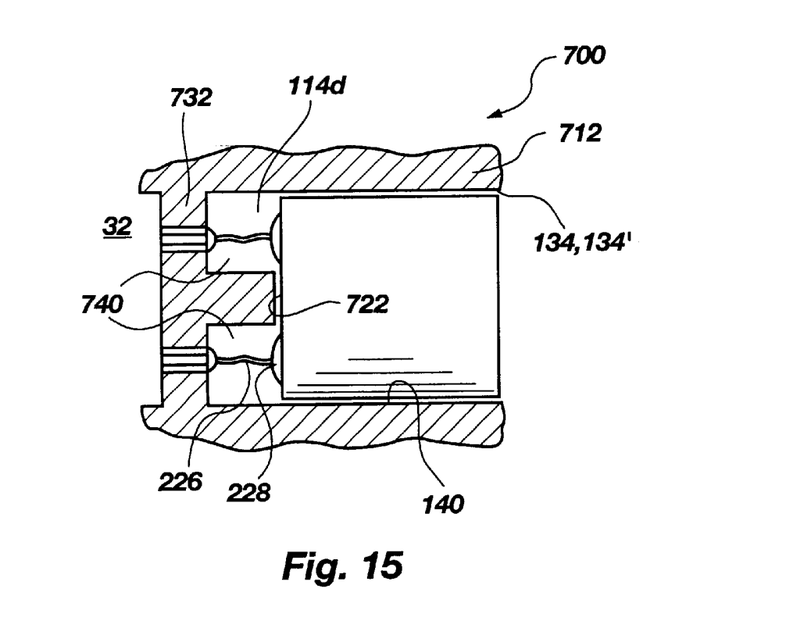

FIGS. 14 and 15 of the drawings depict a pressure crystal 714 configured in accordance with the present invention and its disposition within a fluid-filled chamber 114d of pressure housing 712 of a sixth transducer embodiment 700 according to the invention. Pressure crystal 714 includes a substantially cylindrical exterior side surface or wall 720. Conductive electrodes 724 communicate with the interior of pressure crystal 714 for driving and sensing the frequency response of pressure crystal 714, as known in the art, and preferably extend, as shown, along side surface or wall 720 to and over an end 722 of pressure crystal 714 which is located closest to an electrical feedthrough wall 732 to chamber 32 in pressure housing 712. However, electrodes may also extend over opposing ends of pressure crystal 714. Feedthrough wall 732 includes two recesses 740 (or, alternatively, a single annular recess) facing pressure crystal 714 in chamber 114d to provide sufficient clearance for protruding wires 226 attached to electrodes 724 with conductive epoxy 228. As best shown in FIG. 15, insulating film 134 or inner wall coating 134' preferably extends substantially around wall 720 of pressure crystal 714 for substantially the entire length of pressure crystal 714 to prevent electrical grounding of electrodes 724 to pressure housing 712.

In each of the embodiments of the invention, the annular clearance between the exterior side wall of the pressure crystal (and the side wall of the temperature crystal, if exposed to pressure) and the inner wall of the pressure housing chamber in which it is (or they are) disposed may be as described above with respect to the description of FIG. 3 of the drawings.

While the disclosed embodiments of the invention employ conductive epoxy-bonded wires to electrically connect the electrodes of the crystal or crystals within a pressure housing chamber to supporting electronics, this is merely a preferred attachment technique and the invention is not so limited. For example, a so-called TAB tape (conductive traces on a dielectric film) may be used in lieu of wires, or an anisotropic conductive layer, film or pad may be disposed, for example, between a crystal end (see FIG. 14) with electrodes thereover and conductive terminals in a feedthrough wall to electrically connect a crystal to its associated electronics. Wire connection techniques other than conductive epoxies may be employed, for example, solders, spot-welding and brazing. In addition, resilient spring contacts, as known in the art, may be employed in lieu of wires to electrically connect a crystal to associated electronics.

While the invention has been described in terms of certain preferred embodiments, those of ordinary skill in the art will recognize and appreciate that it is not so limited. Additions to, deletions from, and modifications to the embodiments as illustrated and described herein may be made without departing from the scope of the invention as hereinafter claimed. Further, features and elements associated with one embodiment may be substituted, where appropriate, for corresponding features and elements associated with another embodiment.

What is claimed is:

1. A transducer assembly, comprising:
   a pressure housing comprising an electrically and thermally-conductive material and including a chamber defined within an inner wall thereof; and a pressure crystal disposed within said chamber, said pressure crystal including a side wall sized and configured so that a major portion thereof is no more than about 15 mils from the inner wall of the pressure housing.

2. The transducer assembly of claim 1, wherein the major portion of the pressure crystal side wall is between about one mil and about 15 mils from the inner wall of the pressure housing.

3. The transducer assembly of claim 1, further comprising an electrically insulating element disposed between at least a portion of the pressure crystal side wall and the electrically and thermally-conductive material of the pressure housing.

4. The transducer assembly of claim 3, wherein the electrically insulating element comprises a discrete film interposed between the major portion of the pressure crystal side wall and the inner wall of the pressure housing.

5. The transducer assembly of claim 3, wherein the electrically insulating element comprises a layer of material comprising at least a portion of the inner wall of the pressure housing.

6. The transducer assembly of claim 3, wherein the electrically insulating element is substantially longitudinally coextensive with the inner wall of the pressure housing.

7. The transducer assembly of claim 1, further including a fluid disposed in the chamber.

8. The transducer assembly of claim 1, wherein the major portion of the pressure crystal side wall is substantially cylindrical, and the inner wall of the pressure housing is substantially cylindrical.

9. The transducer assembly of claim 8, wherein substantially the entire pressure crystal side wall is cylindrical, further including two circumferentially-spaced electrodes extending to at least one end of the pressure crystal, and wherein said chamber includes at least one counterbore defined by a second inner wall proximate at least one end of the pressure crystal and of a diameter greater than a diameter of the inner wall of the pressure housing.

10. The transducer assembly of claim 9, further including a wire conductively bonded to each electrode proximate a counterbore, and wherein the at least one counterbore is of a sufficient diameter to clear exposed conductive material at wire bond locations.

11. The transducer assembly of claim 10, further comprising an electrically insulating element disposed between at least a portion of the pressure crystal side wall and the electrically and thermally-conductive material of the pressure housing.

12. The transducer assembly of claim 11, wherein the electrically insulating element comprises a discrete film interposed between the major portion of the pressure crystal side wall and the inner wall of the pressure housing.

13. The transducer assembly of claim 11, wherein the electrically insulating element comprises a layer of material comprising at least a portion of the inner wall of the pressure housing.

14. The transducer assembly of claim 11, wherein the electrically insulating element is substantially longitudinally coextensive with the inner wall of the pressure housing.

15. The transducer assembly of claim 10, further including a fluid disposed in the chamber.

16. The transducer assembly of claim 8, wherein substantially the entire pressure crystal side wall is cylindrical, further including two circumferentially-spaced electrodes extending over the pressure crystal side wall to at least one end of the pressure crystal, and wherein said chamber includes a notch in the inner wall of the pressure housing circumferentially adjacent at least a portion of each electrode proximate the at least one end of the pressure crystal and of a radial extent greater than a diameter of the inner wall of the pressure housing.

17. The transducer assembly of claim 16, further including a wire conductively bonded to each electrode proximate a notch, and wherein the notches are each of a sufficient radial extent to clear conductive material at an adjacent wire bond location.

18. The transducer assembly of claim 17, further comprising an electrically insulating element disposed between at least a portion of the pressure crystal side wall and the electrically and thermally-conductive material of the pressure housing.

19. The transducer assembly of claim 18, wherein the electrically insulating element comprises a discrete film interposed between the major portion of the pressure crystal side wall and the inner wall of the pressure housing.

20. The transducer assembly of claim 18, wherein the electrically insulating element comprises a layer of material comprising at least a portion of the inner wall of the pressure housing.

21. The transducer assembly of claim 18, wherein the electrically insulating element is substantially longitudinally coextensive with the inner wall of the pressure housing.

22. The transducer assembly of claim 17, further including a fluid disposed in the chamber.

23. The transducer assembly of claim 8, wherein the pressure crystal includes two circumferentially-spaced, beveled surfaces in the side wall thereof and electrodes extending from the major portion of the side wall over at least a portion of each of the beveled surfaces.

24. The transducer assembly of claim 23, further including a wire conductively bonded to each electrode on one of the beveled surfaces, and wherein the wires conductively bonded are electrically isolated from the electrically and thermally-conductive material of the pressure housing.

25. The transducer assembly of claim 24, further comprising an electrically insulating element disposed between at least a portion of the pressure crystal side wall and the electrically and thermally-conductive material of the pressure housing.

26. The transducer assembly of claim 25, wherein the electrically insulating element comprises a discrete film interposed between the major portion of the pressure crystal side wall and the inner wall of the pressure housing.

27. The transducer assembly of claim 25, wherein the electrically insulating element comprises a layer of material comprising at least a portion of the inner wall of the pressure housing.

28. The transducer assembly of claim 25, wherein the electrically insulating element is substantially longitudinally coextensive with the inner wall of the pressure housing.

29. The transducer assembly of claim 25, wherein the electrically insulating element extends over the conductive wire bonds.

30. The transducer assembly of claim 24, further including a fluid disposed in the chamber.

31. The transducer assembly of claim 8, wherein the pressure crystal includes two circumferentially-spaced, longitudinally-extending recessed surfaces on the pressure crystal side wall and electrodes extending along at least a portion of each recessed surface to at least one end of the pressure crystal.

32. The transducer assembly of claim 31, further including a wire conductively bonded to each electrode on a recessed surface, and wherein the conductive wire bonds are electrically isolated from the electrically and thermally-conductive material of the pressure housing.

33. The transducer assembly of claim 32, further comprising an electrically insulating element disposed between at least a portion of the pressure crystal side wall and the electrically and thermally-conductive material of the pressure housing.

34. The transducer assembly of claim 33, wherein the electrically insulating element comprises a discrete film interposed between the major portion of the pressure crystal side wall and the inner wall of the pressure housing.

35. The transducer assembly of claim 33, wherein the electrically insulating element comprises a layer of material comprising at least a portion of the inner wall of the pressure housing.

36. The transducer assembly of claim 33, wherein the electrically insulating element is substantially longitudinally coextensive with the inner wall of pressure housing.

37. The transducer assembly of claim 33, wherein the electrically insulating element extends over the conductive wire bonds.

38. The transducer assembly of claim 32, further including a fluid disposed in the chamber.

39. The transducer assembly of claim 8, wherein the pressure crystal includes electrodes extending from the major portion of the pressure crystal side wall onto at least one end of the pressure crystal.

40. The transducer assembly of claim 39, further including a wire conductively bonded to each electrode on said at least one end of the pressure crystal.

41. The transducer assembly of claim 40, wherein the chamber further includes an end wall adjacent the at least one pressure crystal end, and the end wall includes at least one recess therein of a depth at least sufficient to accommodate a conductive wire bond on an adjacent pressure crystal end.

42. The transducer assembly of claim 41, further comprising an electrically insulating element disposed between at least a portion of the pressure crystal side wall and the electrically and thermally-conductive material of the pressure housing.

43. The transducer assembly of claim 42, wherein the electrically insulating element comprises a discrete film interposed between the major portion of the pressure crystal side wall and the inner wall of the pressure housing.

44. The transducer assembly of claim 42, wherein the electrically insulating element comprises a layer of material comprising at least a portion of the inner wall of the pressure housing.

45. The transducer assembly of claim 42, wherein the electrically insulating element is substantially longitudinally coextensive with the inner wall of the pressure housing.

46. The transducer assembly of claim 41, further including a fluid disposed in the chamber.

47. The transducer assembly of claim 1, further including a temperature crystal disposed within the chamber longitudinally adjacent the pressure crystal, the temperature crystal including a side wall sized and configured so that a major portion thereof is no more than about 15 mils from the inner wall of the pressure housing.

48. The transducer assembly of claim 47, wherein the major portion of each crystal side wall is between about one mil and about 15 mils from the inner wall of the pressure housing.

49. The transducer assembly of claim 48, further comprising an electrically insulating element disposed between at least a portion of the side wall of at least one of the crystals and the electrically and thermally-conductive material of the pressure housing.

50. The transducer assembly of claim 49, wherein the electrically insulating element comprises a discrete film interposed between the major portion of at least one of the crystal side walls and the inner wall of the pressure housing.

51. The transducer assembly of claim 49, wherein the electrically insulating element comprises a layer of material comprising at least a portion of the inner wall of the pressure housing.

52. The transducer assembly of claim 49, wherein the electrically insulating element is substantially longitudinally coextensive with the inner wall of the pressure housing.

53. The transducer assembly of claim 48, further including a fluid disposed in the chamber.

54. The transducer assembly of claim 48, wherein the major portions of the crystal side walls are substantially cylindrical, and the inner wall of the pressure housing is substantially cylindrical.

* * * * *